US008750843B2

(12) United States Patent
Forrester et al.

(10) Patent No.: US 8,750,843 B2
(45) Date of Patent: **\*Jun. 10, 2014**

(54) CALL TO ACTION LOCKOUT SYSTEM AND METHOD

(76) Inventors: John Forrester, Coogee (AU); Sam Wilson, Bondi (AU); Tim Smith, Tokyo (JP)

(*) Notice: Subject to any disclaimer, the term of this patent is extended or adjusted under 35 U.S.C. 154(b) by 252 days.

This patent is subject to a terminal disclaimer.

(21) Appl. No.: 13/435,275

(22) Filed: Mar. 30, 2012

(65) Prior Publication Data

US 2012/0192072 A1 Jul. 26, 2012

Related U.S. Application Data

(63) Continuation of application No. 12/299,366, filed as application No. PCT/AU2007/000619 on May 9, 2007, now Pat. No. 8,150,386.

(30) Foreign Application Priority Data

May 10, 2006 (AU) .............................. 2006-100383

(51) Int. Cl.
*H04M 3/42* (2006.01)

(52) U.S. Cl.
USPC ........ 455/414.1; 455/411; 455/419; 455/566; 455/3.06

(58) Field of Classification Search
USPC .............. 455/410–414.4, 418–420, 466, 566
See application file for complete search history.

(56) References Cited

U.S. PATENT DOCUMENTS

| 6,539,240 B1 | 3/2003 | Watanabe |
| 6,768,895 B2 | 7/2004 | Lahtinen |
| 6,795,711 B1 | 9/2004 | Sivula |
| 6,950,623 B2 | 9/2005 | Brown et al. |
| 6,954,611 B2 | 10/2005 | Hashimoto et al. |
| 7,028,327 B1 | 4/2006 | Dougherty |
| 7,042,853 B2 | 5/2006 | Liao et al. |
| 7,248,860 B2 | 7/2007 | Kamdar et al. |
| 7,426,398 B2 | 9/2008 | Reisgies |
| 7,457,583 B2 | 11/2008 | Katayama |
| 7,751,774 B2 | 7/2010 | Muneomi |
| 7,869,792 B1 | 1/2011 | Zhou et al. |

(Continued)

FOREIGN PATENT DOCUMENTS

| AU | 2006100383 B4 | 6/2006 |
| EP | 0852443 | 7/1998 |
| WO | WO 02/073925 | 9/2002 |
| WO | WO 2007/015100 A1 | 2/2007 |

OTHER PUBLICATIONS

International Search Report for International Application No. PCT/AU07/00619 dated Jul. 5, 2007.

(Continued)

*Primary Examiner* — Sharad Rampuria
(74) *Attorney, Agent, or Firm* — Pearl Cohen Zedek Latzer Baratz LLP (57) ABSTRACT

A Call-To-Action Lockout on a mobile device coupled to a data network is disclosed as a method and apparatus comprising providing a media application configured to respond to a control point associated with media content, providing media content which has at least one associated control point, triggering at least one control point while experiencing the media content; and performing an appropriate Call To Action Script (CTAS) in response to the triggered control point.

20 Claims, 5 Drawing Sheets

(56) References Cited

U.S. PATENT DOCUMENTS

| | | |
|---|---|---|
| 7,912,458 B2 | 3/2011 | Ramer et al. |
| 7,920,845 B2 * | 4/2011 | Myllynen et al. ............. 455/410 |
| 2002/0124251 A1 | 9/2002 | Hunter |
| 2002/0129089 A1 | 9/2002 | Hegde et al. |
| 2002/0197982 A1 | 12/2002 | Komsi et al. |
| 2004/0003398 A1 * | 1/2004 | Donian et al. ................. 725/34 |
| 2004/0014454 A1 | 1/2004 | Burgess et al. |
| 2005/0245241 A1 | 11/2005 | Durand et al. |
| 2007/0100805 A1 * | 5/2007 | Ramer et al. ...................... 707/3 |
| 2008/0160956 A1 | 7/2008 | Jackson et al. |
| 2009/0054092 A1 | 2/2009 | Stonefield et al. |

OTHER PUBLICATIONS

Solutions: "Advertising Incentive Control System (AICS)", Smith et al., dated Apr. 8, 2005.

Rieber R: "Flash 8: Advanced Action 1-20 Scripting", Internet citation, Mar. 4, 2005, U RL: http://web.archive.org/web/20050304063742/http://it. coe.uga.edu/studio/new site content/workshops/flash actionscript7flash-scripting adv. ppt.

European Search Report for European Patent Application No. EP 20070718866 dated Dec. 19, 2011.

* cited by examiner

FIG. 6

CALL TO ACTION LOCKOUT SYSTEM AND METHOD

CROSS REFERENCE To RELATED APPLICATION

The present application is a continuation of U.S. patent application Ser. No. 12/299,366, filed Mar. 10, 2009 now U.S. Pat. No. 8,150,386 as a US national phase application of PCT International Patent Application No. PCT/AU2007/000619, filed May 9, 2007, which claimed priority from Australian Patent Publication No. 2006100383, filed May 10, 2006, all of which are incorporated herein in their entireties.

FIELD OF THE INVENTION

The present invention relates to electronic devices and in particular to mobile electronic devices adapted for presenting media content.

The invention has been developed primarily for controlling responses while experiencing media content on mobile electronic devices and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

With the development of mobile technology and hardware, advertisers have been moving their focus to targeting mobile devices as a channel for providing information to consumers about products and services. Due to the advancements and the increase of size of the display screens and the development of faster network connections, advertisers are no longer limited to simple text and individual graphics and sounds but are now able to provide mobile device users with a richer media experiences that may consist of combined media objects, video and audio provided in nearly unlimited length.

Mobile devices typically have only a single user interface window available at any one time. Consequentially even for a mobile device equipped with hyperlink capable browsers, following a link or prompt in media content, or advertisement, typically requires swapping to a phone message function and other application to respond, and then return to whatever activity was originally being performed.

Such a drawback is undesirable, typically leading to any call-to-action response requested within the media content being avoided. Consequentially, advertisers potentially lose sales, and the user misses opportunities to participate in an incentive based claim and to purchase products.

There is a need in the art for a less disruptive and a more integrated method of controlling responses while experiencing digital media.

OBJECT OF THE INVENTION

It is an object of the present invention to overcome or ameliorate at least one of the disadvantages of the prior art, or to provide a useful alternative.

It is an object of the invention in its preferred form to provide a more integrated method of controlling responses while experiencing media content.

SUMMARY OF THE INVENTION

According a first aspect of the invention there is provided a method for Call To Action Lockout on a mobile device coupled to a data network, the method comprising:
 providing a media application configured to respond to a control point associated with media content;
 providing media content which has at least one associated control point;
 triggering at least one control point while experiencing the media content; and
 performing an appropriate Call To Action Script (CTAS) in response to the triggered the control point.

The method preferably further comprises prompting for a response, and transmitting the response to CTAL application server. Prompting for a response mechanism is preferably in the form of any one of or more selected from the set comprising: a question, poll, competition entry, feedback and data collection. Preferably the response is stored.

The media content preferably includes any data format suitable for processing by the media application. The media content is preferably in the form of any one or more selected from the set comprising audio, animation, video, text and an image. This media content is preferably provided by being downloaded, preloaded or streamed Over The Air (OTA).

Preferably the control point is triggered by reference to any one or more of the following: a timing track; a counter; or parsing of the media content received by the media application.

The media player is preferably provided to the mobile device over the data network via a protocol in the from of any one or more selected from the set comprising: SMS, MMS, WAP and GPRS.

According a second aspect of the invention there is provided an apparatus for Call To Action Lockout on a mobile device coupled to a data network, the apparatus comprising:
 a CTAL Application Server configured to provide media content having at least one associated control point; the CTAL Application Server is coupleable to a data network for providing the media content.

Preferably the apparatus comprises a CTAS Application Server for providing an associated CTAS to define the control point, wherein the CTAS Application Server is coupled to the network and configured to provide the corresponding CTAS to the CTAL Application Server. Preferably the apparatus further comprises a Media Database containing media content, and a Media Server configured to retrieve the media content the Media Server further configured to provide the media content to the a CTAL Application Server for subsequently providing to a mobile device coupled to the network.

Preferably the apparatus comprises a Media Database containing media content, and a Media Server configured to retrieve the media content; the Media Server further configured to provide the media content to the a CTAL Application Server for subsequently providing to a mobile device coupled to the network, wherein the CTAL Application Server provides the corresponding CTAS for defining the control point.

Preferably the apparatus comprises a mobile device coupled to the data network, and configured to have a media application; the mobile device is further configurable to trigger at least one control point and perform an appropriate Call To Action Script (CTAS) in response to the triggered control point.

Preferably the apparatus comprises a Response Database Server coupled to the network for receiving and storing a response from a mobile device in response to a triggered Call-To-Action.

According a third aspect of the invention there is provided an apparatus for Call To Action Lockout on a mobile device coupled to a data network, the apparatus comprising:

a mobile device coupled to a data network, and configured to have a media application for experiencing media content; the mobile device is configurable to trigger at least one control point and perform an appropriate Call To Action Script (CTAS) in response to the triggered the control point; the mobile device is further configured to transmitting a response to a CTAL application server.

Preferably the apparatus comprises a CTAL Application Server configured to provide the media content having at least one associated control point; the CTAL Application Server is coupleable to a data network for providing the media content. Preferably the apparatus further comprises a CTAS Application Server for providing an associated CTAS to define the control point, wherein the CTAS Application Server is coupled to the network and configured to provide the corresponding CTAS to the CTAL Application Server. Preferably the apparatus yet further comprises a Media Database containing media content, and a Media Server configured to retrieve the media content; the Media Server further configured to provide the media content to the CTAL Application Server for subsequently providing to a mobile device coupled to the network.

Preferably the apparatus comprises a CTAL Application Server configured to provide the media content having at least one associated control point; the CTAL Application Server is coupleable to a data network for providing the media content. Preferably the apparatus further comprises a Media Database containing media content, and a Media Server configured to retrieve the media content; the Media Server further configured to provide the media content to the CTAL Application Server for subsequently providing to a mobile device coupled to the network, wherein the CTAL Application Server provides the corresponding CTAS for defining the control point.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

The preferred embodiment relates a system and method, Call-To-Action Lockout (CTAL), for controlling the availability and timing of call-to-actions or responses to media content while it is being experienced. This media content may include text, audio, animation, video and images that are downloaded to, preloaded on or streamed Over The Air (OTA) to any electronic device. Preferably these devices are mobile electronic devices including cellular phones, cellular equipped PDA's, MP3 players, MP4 players, handheld computers or other wireless terminal devices.

Preferably the method regulates, controls and captures responses to a call-to-action associated with media content experienced on a mobile device.

The preferred embodiment further provides a method and apparatus for associating Call-To-Actions with media content which are triggered while the media content is being experienced, e.g. displayed or played on a mobile device. These Call-To-Actions are preferably triggered as the media content is being experienced, depending on where an associated control point has been positioned within the media content data. When the appropriate Call-To-Action is evoked, a response or participation in this process is requested. Responses are typically regulated, controlled and captured and may be transmitted to a secondary storage device.

For example this can be applied when experiencing branded media content, whereby a participant must experience the media clip and answer an associated Call-To-Action. This Call-To-Action may require a participant to answer a question relating to the media clip before being eligible to participate in a competition. Call-To-Action events further includes the possibility of voting, entering a code to win a prize, answer a question, submitting information to join a game, receive products or any interaction that might be timed or controlled.

Figure 1:
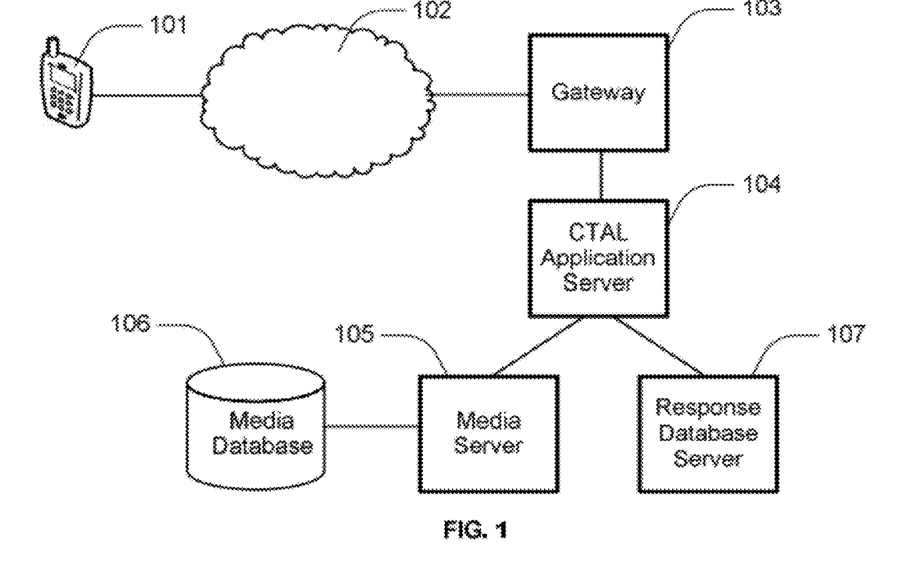
FIG. 1 is a block diagram of an example architecture for Call To Action Lockout (CTAL) according to the invention.
Figure 2:
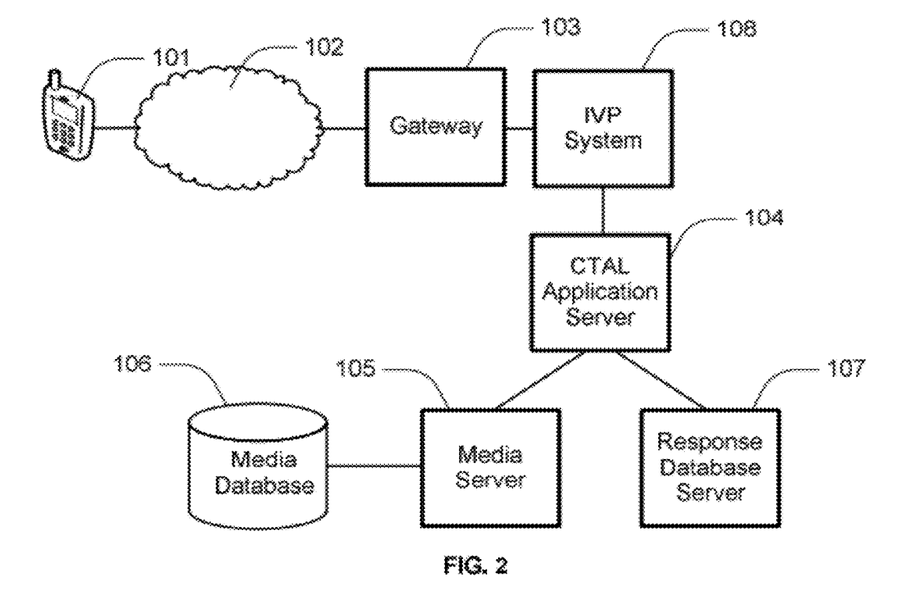
FIG. 2 is block diagram of an example Call To Action Lockout for a video call system.
Figure 3:
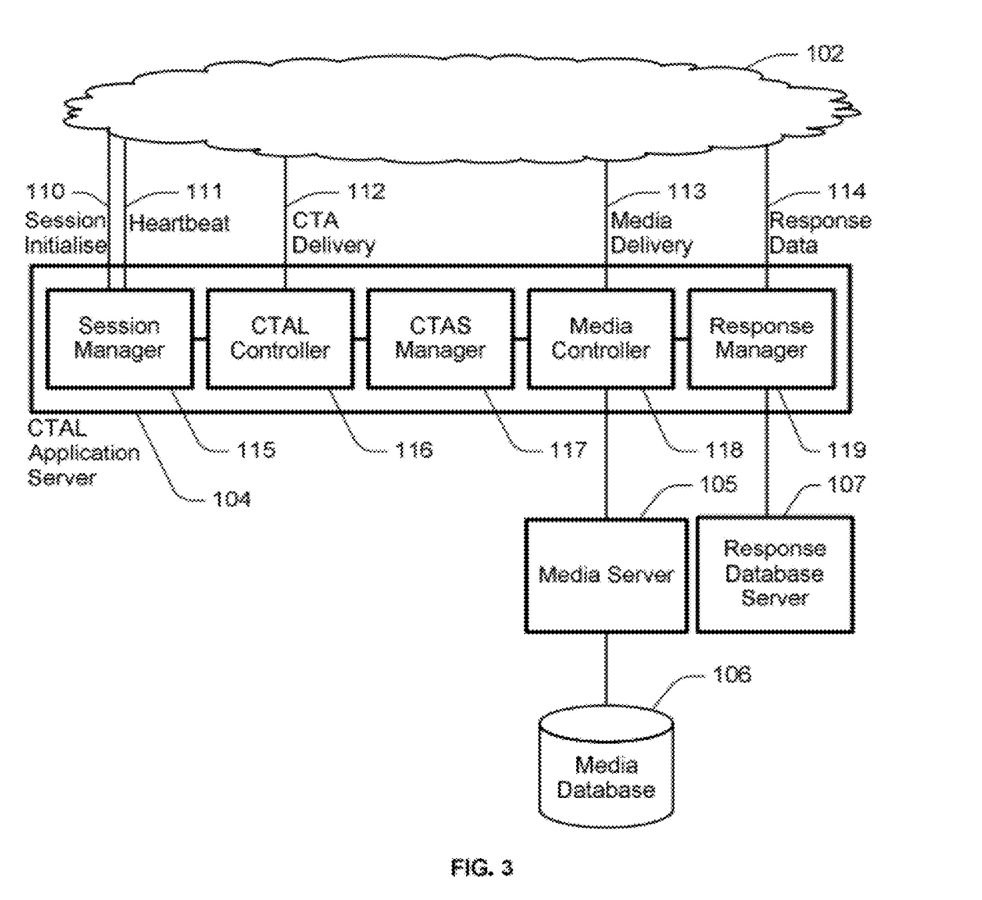
FIG. 3 is block diagram of an example Call To Action Lockout, showing the delayed relationship between the CTAL Application server and the other components.

Referring initially to FIGS. 1 to 3, there is provided block diagrams of example embodiments of a CTAL apparatus.

FIG. 1 shows a block diagram of the overall architecture of an embodiment of CTAL. This embodiment includes a Cellular Enabled Mobile Device 101 coupled to a Wireless Network 102. The Cellular Enabled Mobile Device 101 receives media content and transmits responses to any triggered Call-To-Action(s) from/to a Gateway 103, via the Wireless Network 102. The Gateway 103 acts as an intermediary between a controlling CTAL Application Server 104 and the Wireless Network 102. The CTAL Application Server 104 will request media content from a Media Server 105, which is stored on a Media Database 106, and the corresponding CTAS, and then transmit them to the Cellular Enabled Mobile Device 101. In one embodiment the CTAS is provided by a CTAS Application Server, alternatively the CTAS may be provided directly from a Media Server. Conceptually the CTAS Application Server is a software or hardware component that provides an appropriate CTAS. Depending on the Call-To-Action and the response(s) generated the CTAL Application Server 104 may request and transmit further media content and associated CTAS. The CTAL Application Server 104 also forwards captured responses to the Response Database Server 107 for subsequent storage.

The Wireless network 102 is used to transmit data between coupled devices. It would be appreciated that the wireless network may be switched or packetised without limiting the scope of the present invention. It would be further appreciated that data transfer may be performed by any suitable network protocol or set of network protocols without limiting the scope of the present invention.

FIG. 2 shows an example block diagram of the overall architecture of an embodiment of a CTAL video call. This embodiment includes a Cellular Enabled Mobile Device 101 coupled to a Wireless Network 102. The Cellular Enabled Mobile Device receives media content and transmits responses to any triggered Call-To-Action(s) from/to a Gateway 103, via the Wireless Network. The Gateway 103 acts as an intermediary between a Interactive Video Platform (IVP) System 108 and the Wireless Network 102. The IVP System 108 forwards data between the Gateway 103 and a CTAL Application Server 104. The CTAL Application Server 104 will request media content and the corresponding CTAS from a Media Server 105, which is stored on a Media Database 106, and transmit them to the Cellular Enabled Mobile Device 101. Depending on the Call-To-Action and the response(s) generated the CTAL Application Server 104 may request and transmit further media content and associated CTAS. The CTAL Application Server 104 also forwards captured responses to the Response Database Server 107 for subsequent storage.

It would be appreciated by a person skilled in the art that servers perform a predetermined function, and that this function is not substantially limited by their physical configuration. In some embodiments one or more of the CTAL Application Server 104, Media Server 105, Response Database Server 107 and IVP System 108 may be performed within a single physical electronic device, this device being configured to perform each predetermined function. Likewise the Media Database 106 may be stored and managed by a separate electronic device, or alternatively by an electronic device providing multiple functions to the system.

FIG. 3 illustrates an example block diagram outlining the relationship between a CTAL Application server 104 and the other components of a CTAL Process. The CTAL Application Server 104 is first accessed to initiate a Session 110, which is monitored by a Session Manager 115.

The Session Manager 115 typically monitors a heartbeat 111 in the form of a periodic ping request to indicate that the CTAL application or session is still active on the mobile device. While the heartbeat 111 is maintained between the mobile device and the Session Manager 115 and in the absence of receiving "end session request," the Session Manager 115 retains the session information and the session remains active.

CTA Delivery 112 is influenced by a CTAL Controller 116, which in turn controls a CTAS Manager 117, a the Media Controller 118 and a Response Manager 119. The CTAL Controller 116 requests the CTAS Manager 117 and the Media Controller 118 to respectively locate the CTAS and Media to be delivered 113. The Media Controller 118 requests to the Media Server 105 to extract the specified media from the Media Database 106.

Response Data 114 is received by the Response Manager 119, and transmitted to a Response Database Server 107 for storage.

The Session Manager 115, CTAL controller 116, CTAS Manager 117, Media Controller 118 and Response Manager 119 are typically applications hosted on the CTAL Application Server 104.

Figure 4:
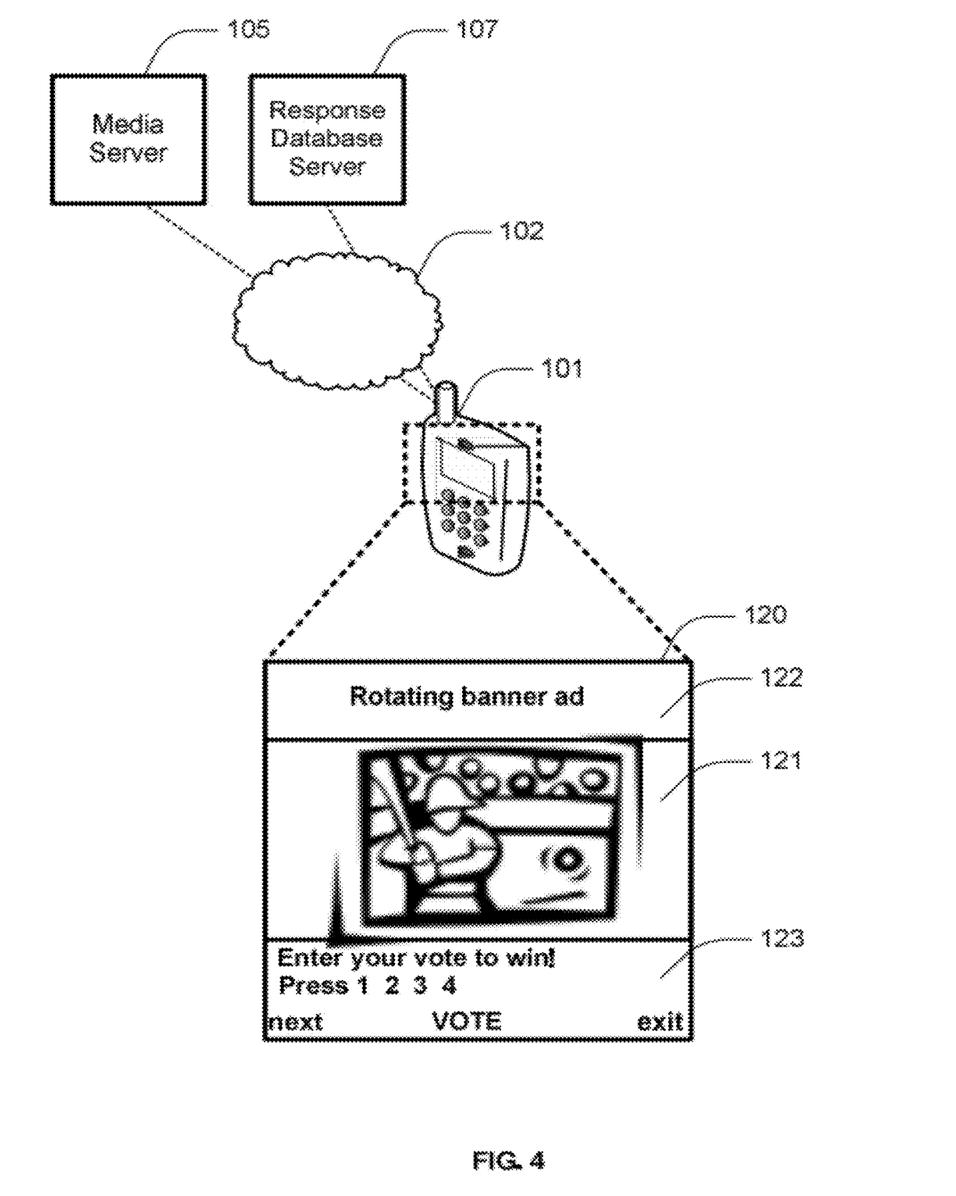
FIG. 4 is an example screen layout of a mobile device configured to perform Call To Action Lockout.
Figure 5:
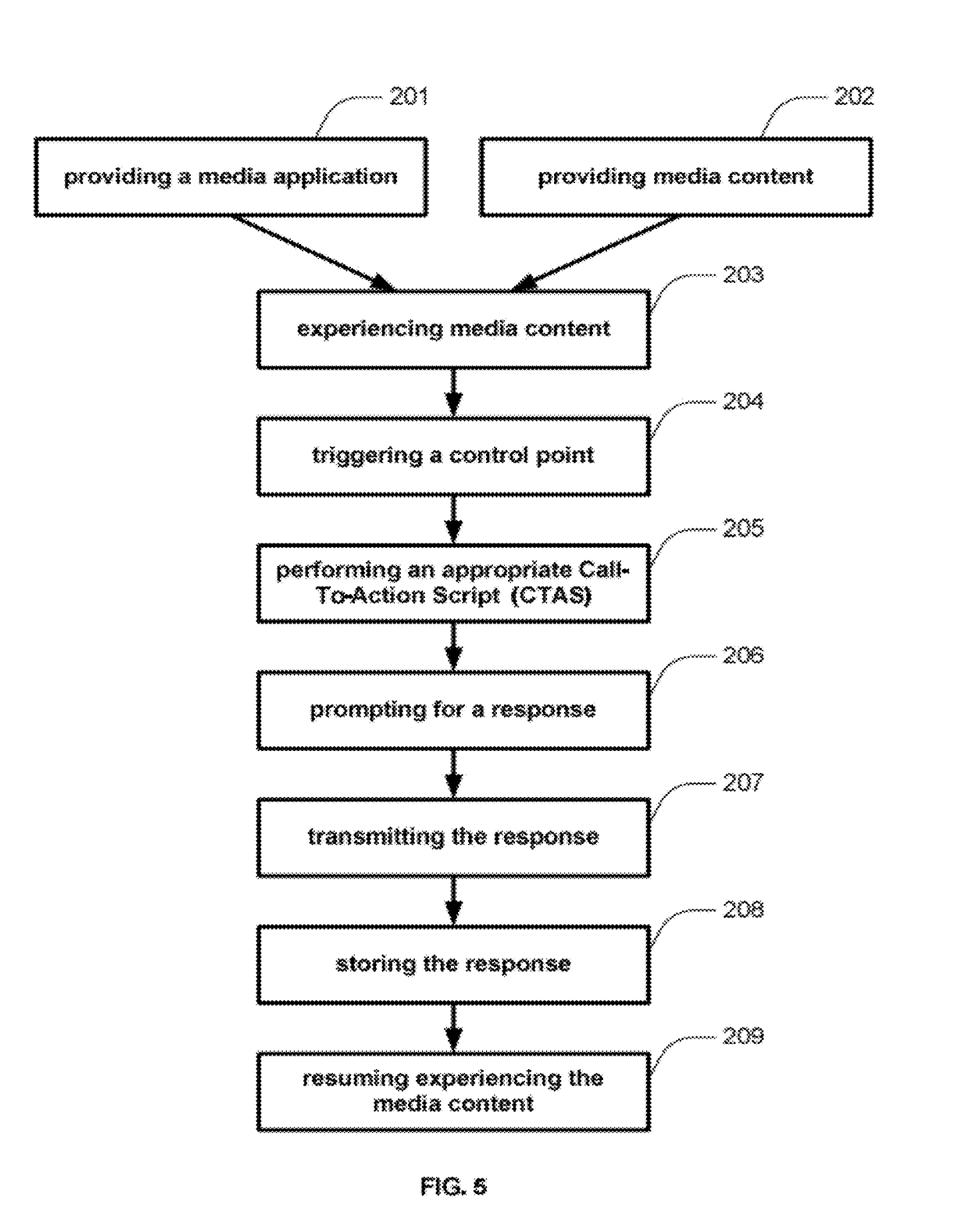
FIG. 5 is an example flowchart of a method of performing Call To Action Lockout.

Referring now to FIGS. 4 and 5, a number of example methods for Call-to-Action lockout are described.

FIG. 4 shown an example screen configuration for a mobile device 101 is shown. The Media Server 105 provides media content with a Call-To-Action. The Mobile Device 101 displays the media content 121, which may include dynamic ad content in the form of a rotating banner ad 122. Once the first control point has been reached the CTAL media application will execute its first predetermined action and the user is prompted to respond to a CTA 123. The response data is recorded and stored on the response database server 107 for subsequent sales, marketing and fulfilment use.

The association of a Call-To-Action with media content is accomplished by a control point. By inter-relating the media with a control point, the media content may be controlled. These control points are typically in the form of a CTAS (Call-To-Action Script). A control point may be directly embedded in the media content. Alternatively, a control point may be provided in a separate data file, or entity. The separate data file is typically delivered in conjunction with the media content or acquired on demand when the associated media application calls the media content to be experienced. System developers may refer to, implement, or enable these control points when associating available actions or responses within application programmable interface (API).

The CTAS is preferably acquired and interpreted by the media application or interface application. The associated control points are typically available though an API whereby the same or a related application manages the associated Call-To-Action events.

A CTAS is preferably independent of the media data. More preferably the media data is dependent upon the CTAS for exercising control over the media player application whereby the user interface is controlled by the CTAS. In this embodiment, the media content can not be experienced with out involving the CTAS.

As the media application presents the media content and interprets the CTAS, Call-To-Action events are triggered requiring interaction or the receipt of additional information. The implementation of this operation is dependent upon how the media application or interface is programmed. In an embodiment, a predetermined amount of the media content may need to be experienced before an appropriate Call-To-Action event is triggered.

A Control Point is a trigger that is read by the media application. Depending on the media a control point may include any one of a timed, tagged, media time-coded, counted or fulfilled trigger.

These control point types can be described by way of example:

| | |
|---|---|
| Timed | e.g. If the media content is provided by a Real Time Protocol (RTSP) server, then server-side control will be via the reading time-code to used as the reference point; or |
| | e.g. An internal timer may be initiated and use as the session time-base for relating control points and/or media transmission. |
| Tagged | e.g. Using an actual reference point data marker within the media content. |
| Media time-coded | e.g. The media is provided by a 'download and play' then the internal media time-code will be used and will be referenced to an acquired 'control point manifest'. This Control Point Manifest can be an XML file that contains referential data and control points that will be interpreted by the CTAL media application. |
| Counted | e.g. After 5 photos have been experienced. |
| Fulfilled | e.g. For static media content the name and content size of the object to reference it will be used as a 'control point' |

Once a control point has been identified by the media application, the corresponding CTAS is activated.

The CTAS contains instructions that informs the CTAL application server on which steps to follow next. For example these steps may include any one of the following:
 a) pause media;
 b) prompt viewer to respond to CTA;
 c) capture and respond to a users response;
 d) if no response then go back to initial screen; and
 e) continue with media experience.

It would be appreciated that an embodiment enables media content be provided to a mobile device in such a way as to allow the user to interact and respond to a Call-to-Action. The response may be in the form of submitting an answer to a question (eg in a keypress, text field, radio box, dropdown menu), filling out a survey, obtaining further information from advertisers, providing personal information or any type of information requested in a controlled and managed process. This is achieved without substantially detracting from the original experience of the media content.

FIG. 5 show an example flowchart of a method of performing Call To Action Lockout. The method comprises the steps of:
a) providing a media application 201 configured to respond to a control point associated with media content 202;
b) providing media content 202 which has at least one associated control point;
c) experiencing the media content 203;
d) triggering at least one control point 204; and
e) performing an appropriate Call To Action Script (CTAS) 205 in response to the triggered control point.

In this embodiment the method further comprises prompting for a response 206 and transmitting the response to CTAL application server 207. In this embodiment the method still further comprises storing the response 208.

The media content is typically resumed such that the remaining portion can be experienced 209.

Figure 6:
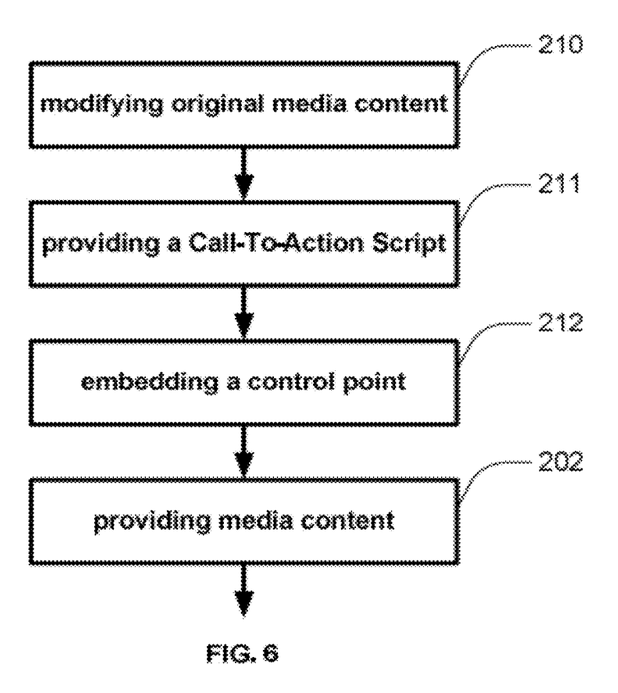
FIG. 6 is an example flowchart of a method of providing media content for performing Call To Action Lockout as shown in FIG. 5.

FIG. 6 shows another embodiment which enables content providers (including advertisers) to supply media content to a content intermediary. This intermediary provides the application distributor with the media content who then manages any one or more of the following:
a) modifying the media content for including appropriate control point(s) 210;
b) providing Call-To-Action Script(s) (CTAS) 211; and
c) embedding the control point(s) into a separate data content for delivery in conjunction with the media content 212.

In yet another embodiment there is provided a method of creating an interactive experience between content providers (including advertisers) and users of mobile devices. This method is implemented using communication terminals connected to a server via a communication network, and including the steps of:
a) providing a database for hosting selected media content;
b) providing an Application Programmable Interface (API) for enabling system application providers to append selected content whereby to include one or more control points;
c) triggering a control point within a media application or interface application whereby the application responds to the CTAS by pausing, replaying or stopping the content delivery;
d) prompting a person experiencing the media content to provide a response to an interactive experience;
e) capturing the response;
f) exporting the captured response to a secondary storage or recording device via network;
g) resuming content delivery until the experience is competed or another CTAS is triggered.

In an embodiment an interactive application interface control system is regulated or controlled by an associated data file that contains marker tags or timed scripts known as the "control point". A media application is stored locally or communicated electronically to provide necessary functional data. Media content, in any data format readable by a media application, includes control points. These control points may include timing tracking, counter or actual parsing of the data received by a media application or player. When a control point is reached a "Call To Action Script" (CTAS) is triggered. This inter-relates the media content with a user response mechanism.

Preferably a user response mechanism may be in the form of a question, poll, survey, competition entry, feedback and/or data collection.

The CTAS is preferably associated with regulating, controlling and capturing responses to call-to-action prompts that are part thereof or follow any media content experienced on a mobile device.

The media data file is preferably received via pre-loading, Over-the-Air (OTA) downloads and/or streaming.

The CTAS is preferably transmitted via SMS, MMS, WAP, GPRS or other Over-the-Air (OTA) transmission methods.

Further embodiment will now be described in the following six examples. These embodiments are by way of example only. Furthermore while some embodiments described herein include some but not other features included in other embodiments, combinations of features of different embodiments are meant to be within the scope of the invention, and form different embodiments, as would be understood by those in the art.

Example 1

By way of example, an advertiser prefers to deliver branded media content to a target recipient. The advertiser additionally prefers to provide a Call-To-Action function at the end of the media content, which enables a response to be requested and captured.
This embodiment:
a) encourages the target recipient to experience the entire advertising message;
b) provides an incentive to the target recipient to encourage brand loyalty and continued participation;
c) provides an additional brand message and ongoing solicitation; and
d) captures response information.

Example 2

By way of example, a campaign is adapted to be run in conjunction with a sporting event such as a baseball game, with branded high-value media content selected to appeal to the fans of the sport, such as video footage of the leading homerun hitter of a baseball league.

The advertiser may provide a "call-to-action" at the end of the video footage which will prompt a response that will be captured and stored.
This embodiment:
a) encourages the target recipient to watch the media content by offering high value content;
b) provides an incentive to the target audience to encourage brand loyalty and continued participation;
c) provides additional brand message(s) and ongoing solicitation;
d) captures response information to be saved in a secondary storage device;
e) uses the captured response information for additional mobile device push marketing and other advertising opportunities; and
f) ensures that the brand or media content is received by the target recipient, as a requirement to participate in the Call-to-Action.

Advertising may be carried out prior and during the sport event, such as broadcasted on TV or in selected print media, to encourage the fans of the sport and to provide an innovative, interactive, memorable branded experience.

In this example, the advertising may advises a target audience to visit a mobile enabled website (WAP site) via a cellular enabled mobile device and to download a CTAS enabled media player. The video feed could then be streamed to the mobile device OTA via a Media Manager Server, where it has been modified to include control points and/or CTASs. As the video feed finishes, prior to any other function, a CTAS will be called and a voting screen displayed.

The target audience will then be prompted to submit their vote for a particular variable via the mobile devices keypad (or keyboard depending on device). Upon submitting their choice, they could be informed that their vote has been recorded and they have been entered into the draw to win. The target audience may then be further prompted to provide certain demographic information (determined by the client and advertising agency) into text fields displayed, for which they may receive another entry in the draw to win.

All submitted data will be routed via a communications network, and associated devices, which will communicate the submission to a computer or computer network such as a "Response Manger Server".

This Response Manger Server processes the submission and extracts the selected information requested by the advertiser to be collected. For example the information requested can include:

a) variable voted on;
b) mobile number;
c) age;
d) sex; and
e) other general demographic information.

Example 3

By way of example, a video-call campaign is run in conjunction with a movie trailer promotion. A target audience is prompted by a television advisement to call a video number to watch the latest movie trailer and enter into a promotion to win a prize.

The target participant calls the video-call number, which transmits their call over a wireless network (switched or packet) to a mobile phone station then through the mobile network to a 3G gateway.

This call gets transferred from the 3G gateway to the IVP System to the CTAL Application Server which then opens a session between the application server and the mobile device.

The CTAL application server sends back a selection of predetermined choices associated with the video-call number.

Initial Entry Screen
In this example the CTAL Application Server transmits back through the video-call 3 choices in text:

| | |
|---|---|
| Press 1. | to watch the trailer and enter a competition to win free tickets |
| Press 2. | to watch the trailer and take a survey about the movie |
| Press 3. | to receive movie times and locations |

The target participant then presses "1", which is captured and transmitted to the CTAL Application Server.

The CTAL application server retrieves the requested media content from the media server and the associated CTAS. The CTAL Application Server forwards the 30 second video trailer media content to the mobile device for viewing.

Once the first control point has been reached the CTAL media application will execute its first predetermined action—stopping the transmission of the movie trailer at the 20 second mark and the user is prompted to respond to a CTA:

Call To Action Screen One
The call-to-action is: "What colour is the super heroes underwear for a free double pass", and three choices are displayed on the mobile device for the target participant to choose from

| What colour is the super heroes underwear for a free double pass | |
|---|---|
| Press 1. | for Red |
| Press 2. | for Blue |
| Press 3. | for Black |

The mobile device target participant chooses option 1. for red by pressing key "1". This selection is transmitted to the CTAL Application Server, which processes the response and determines whether the choice it is correct or not. Transmission of the key press can be made using Dual Tone Multi-frequency (DTMF).

The CTAL Application Server sends back a message in accordance with the correctness of the response which is predetermined.

You chose Red. Correct! Enter your name, address and age to go into the draw

Data entry fields for text are sent to the mobile device to allow the target participant to enter details, which are then transmitted back to the CTAL Application Server and stored on response database server.

Once the information has been received the CTAL Application Server completes the remaining 10 seconds of the movie trailer transmission. The mobile device is transmitted an initial menu screen in order to make additional selections (in this case it displays 3 choices).

Intial Menu Screen One

| | |
|---|---|
| Press 1. | to watch the trailer and enter a competition to win free tickets |
| Press 2. | to watch the trailer and take a survey about the movie |
| Press 3. | to receive movie times and locations |

The mobile device target participant then presses "2" which is sent back through the video call to the CTAL Application Server. The CTAL Application Server retrieves the selected media content from the media server and the corresponding CTAS.

The CTAL Application Server transmits the media content (which in this example is a 30 second video trailer) to the mobile device for viewing.

Once the first control point has been reached the CTAL system will execute its first predetermined action—stopping the transmission of the movie trailer at the 15 second mark and transmitting the mobile device user a call-to-action (whereby three choices are displayed on the mobile device):

Call to Action Screen Two

| Do you like the movie so far? | |
|---|---|
| Press 4. | for Yes |
| Press 5. | for No |
| Press 6. | for Undecided |

The mobile device user chooses option 1. for "Yes" by pressing key "1". This selection is communicated to the CTAL Application Server and stored by the Response Database server. The media application then continues to play the movie trailer.

Example 4

By way of example, a video-call campaign has been created to be run in conjunction with a client's latest product offering, for example the launch of a new mobile phone handset. The user is instructed to dial a special video-call number which will connect them to a CTAL Application Server.

The CTAL Application Server presents the user with media content cues and prompts a response to a few questions (CTA), before completing the campaign process and ultimately qualifying for an incentive based prize(s).

The response data is recorded and stored on the response database server for subsequent sales, marketing and fulfilment use.

In addition, the user may opt-in to special offers and the data may be used to provide additional, dynamically generated CTAL campaigns to the user.

Example 5

By way of example, a user subscribes to a free online newspaper which may be read on demand via the mobile device. The publisher gains advertising revenues by offering this high-value content while maintaining a means to control what and how the content is delivered to the device. To encourage more subscriptions to the service, special incentive based campaigns may also be included within the content delivered.

The CTAL application Server delivers content to the user and provides the above features to the reader, advertiser and publisher in the following manner.

The user begins the process by accessing a special mobile device website (WAP). Upon entering the site, a unique user session is established and the CTAS is initiated. Based on the CTAS, the content is provided to the user in a controlled and response-required manner.

According to the CTAS the user may experience a CTA at predetermined intervals. These CTA events may require a response by the user to continue experiencing the desired content(s).

The response data from the session is received and stored by the response database server for later analysis and potential use in sales or marketing efforts.

Example 6

By way of example, a user downloads and installs a small application for providing useful information such as restaurant guide and reviews for different cities. The application is provided free to the user and revenue is generated by means of advertising, coupon collection or other value added services to the restaurant providers.

The application includes CTAS technology to control the CTA cues, which prompts responses from the user in conjunction with experiencing the media content. The application can be seen as a simple CTAS enabled 'front-end' to a CTAS controlled Media Server.

As content is provided to the user, CTA cues are included which prompt a response. For example, the user may be asked a series of short direct response questions prior to receiving requested restaurant information. Upon completion of the CTA, the user will receive the requested content.

Additional response or data may be elicited by CTAS to include special coupon offers, discounts or other incentive based prize(s).

The session data is received and stored by the response database server for later analysis and potential use in sales or marketing efforts.

The previous six examples described by way of example only. It would be appreciated by those skilled in the art that some embodiments described include some but not other features included in other embodiments, combinations of features of different embodiments are meant to be within the scope of the invention, and form different embodiments.

It will be appreciated that the illustrated method and apparatus provides a more integrated method of controlling responses while experiencing digital media content.

Further Interpretation

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Unless specifically stated otherwise, as apparent from the following discussions, it is appreciated that throughout the specification discussions utilizing terms such as "process", "processing", "computing", "calculating", "determining" or the like, refer to the indication and/or processes of a computer or computing system, or similar electronic computing device, that manipulate and/or transform data represented as physical, such as electronic, quantities into other data similarly represented as physical quantities.

In alternative embodiments, the one or more processors operate as a standalone device or may be connected, e.g., networked to other processors, in a networked deployment, the one or more processors may operate in the capacity of a server or a client machine in server-client network environment, or as a peer machine in a peer-to-peer or distributed network environment.

The software may further be transmitted or received over a network via a network interface device. While the network is shown in an exemplary embodiment to be a single medium, the term "network" should be taken to include a single medium or multiple media (e.g., a centralized or distributed database, and/or associated caches and servers) that store the one or more sets of instructions. The term "network" shall also be taken to include any medium that is capable of storing, encoding or carrying a set of instructions for execution by one or more of the processors and that cause the one or more processors to perform any one or more of the methodologies of the present embodiments. A carrier medium may take many forms, including but not limited to, non-volatile media, volatile media, and transmission media.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Furthermore, while some embodiments described herein include some but not other features included in other embodiments, combinations of features of different embodiments are meant to be within the scope of the claims, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element.

In the description provided herein, numerous specific details are set forth. However, it is understood that embodiments may be practiced without these specific details. In other instances, well-known methods, structures and techniques have not been shown in detail in order not to obscure an understanding of this description.

Although the invention has been described with reference to specific examples, it will be appreciated by those skilled in the art that the invention may be embodied in many other forms.

The invention claimed is:

1. A method, performed by a mobile device, for providing media content, the method comprising:
   providing, via a media application, playback of a media content item;
   triggering a control point during the playback of the media content item, wherein the control point is triggered by reference to any one or more of the following: a timing track, a counter, and parsing of content received by the media application;
   in response to the triggering of the control point:
   (i) preventing further playback of the media content item; and
   (ii) prompting a user of the mobile device to perform a specified action via the mobile device; and
   in the case that the user performs the specified action, resuming playback of the media item.

2. A method according to claim 1 wherein performance of the specified action results in the generation of data in the mobile device, and the method further comprises transmitting that data to a server device.

3. A method according to claim 1 wherein the specified action includes any one of or more selected from the group consisting of: responding to a question, responding to a poll, submitting a competition entry, providing feedback, and providing other requested data.

4. The method according to claim 1 wherein the media content item is in the form of any one or more selected from the group consisting of: audio, animation, video, text and an image.

5. The method according to claim 1 wherein the media content item is provided to the media device by a remote server.

6. The method according to claim 5 wherein the media content item is provided by the remote server in a format suitable for streamed playback.

7. The method according to claim 5 wherein the media content item is provided via a protocol in the form of any one or more selected from the group consisting of: SMS, MMS, WAP and GPRS.

8. The method according to claim 1 wherein the media player is provided to the mobile device over said data network via a protocol in the form of any one or more selected from the group consisting of: SMS, MMS, WAP and GPRS.

9. The method according to claim 1 further comprising downloading from a server device data indicative of the control point.

10. The method according to claim 1 further comprising downloading from a server device data to thereby enable the prompting.

11. A server device that makes available for download to one or more mobile devices computer readable code executable via a given one of the mobile devices, wherein execution of the computer readable code configures said one or more mobile devices to perform a method comprising:
   providing, via a media application, playback of a media content item;
   triggering a control point during the playback of the media content item, wherein the control point is triggered by reference to any one or more of the following: a timing track, a counter, and parsing of content received by the media application;
   in response to the triggering of the control point:
   (i) preventing further playback of the media content item; and
   (ii) prompting a user of the mobile device to perform a specified action via the mobile device; and
   in the case that the user performs the specified action, resuming playback of the media item.

12. The method according to claim 11 wherein performance of the specified action results in the generation of data in the mobile device, and the method further comprises transmitting that data to a server device.

13. The method according to claim 11 wherein the specified action comprises any one of or more selected from the group consisting of: responding to a question, responding to a poll, submitting a competition entry, providing feedback, and providing other requested data.

14. The method according to claim 11 wherein the media content item is in the form of any one or more selected from the group consisting of: audio, animation, video, text and an image.

15. The method according to claim 11 wherein the media content item is provided to the media device by a remote server.

16. The method according to claim 15 wherein the media content item is provided by the remote server in a format suitable for streamed playback.

17. The method according to claim 15 wherein the media content item is provided via a protocol in the form of any one or more selected from the group consisting of: SMS, MMS, WAP and GPRS.

18. The method according to claim 11 wherein the media player is provided to the mobile device over said data network via a protocol in the form of any one or more selected from the group consisting of: SMS, MMS, WAP and GPRS.

19. The method according to claim 11 further comprising downloading from a server device data indicative of the control point.

20. The method according to claim 11 further comprises downloading from a server device data to thereby enable the prompting.

* * * * *